US009118089B2

(12) United States Patent
Friesen et al.

(10) Patent No.: US 9,118,089 B2
(45) Date of Patent: Aug. 25, 2015

(54) METAL-AIR CELL WITH ION EXCHANGE MATERIAL

(75) Inventors: Cody A. Friesen, Fort McDowell, AZ (US); Derek Wolfe, Adrian, MI (US); Paul Bryan Johnson, Phoenix, AZ (US)

(73) Assignee: FLUIDIC, INC., Scottsdale, AZ (US)

( * ) Notice: Subject to any disclaimer, the term of this patent is extended or adjusted under 35 U.S.C. 154(b) by 0 days.

(21) Appl. No.: 13/526,342

(22) Filed: Jun. 18, 2012

(65) Prior Publication Data

US 2012/0321970 A1    Dec. 20, 2012

Related U.S. Application Data

(60) Provisional application No. 61/498,308, filed on Jun. 17, 2011, provisional application No. 61/568,875, filed on Dec. 9, 2011.

(51) Int. Cl.
*H01M 10/0565* (2010.01)
*H01M 12/06* (2006.01)
*H01M 12/08* (2006.01)

(52) U.S. Cl.
CPC .............. *H01M 12/06* (2013.01); *H01M 12/08* (2013.01); *H01M 2300/0082* (2013.01); *Y02E 60/522* (2013.01)

(58) Field of Classification Search
CPC ............................................. H01M 2300/0082
USPC ...................... 429/304, 306, 314, 317; 521/25
See application file for complete search history.

(56) References Cited

U.S. PATENT DOCUMENTS

| 2001/0038937 | A1* | 11/2001 | Suzuki et al. .................... 429/33 |
| 2003/0065037 | A1 | 4/2003 | Mattison et al. |
| 2004/0241537 | A1 | 12/2004 | Okuyama et al. |
| 2008/0096061 | A1 | 4/2008 | Burchardt et al. |
| 2008/0251759 | A1 | 10/2008 | Kalb et al. |
| 2009/0136818 | A1* | 5/2009 | Fujibayashi et al. ............ 429/33 |
| 2010/0137460 | A1 | 6/2010 | Bert et al. |
| 2010/0285375 | A1 | 11/2010 | Friesen et al. |
| 2010/0323249 | A1 | 12/2010 | Fujiwara et al. |
| 2011/0027664 | A1 | 2/2011 | Burchardt |
| 2011/0027666 | A1 | 2/2011 | Burchardt et al. |

(Continued)

FOREIGN PATENT DOCUMENTS

| CN | 1946673 | 4/2007 |
| CN | 101137436 | 3/2008 |

(Continued)

OTHER PUBLICATIONS

Masahiro Yoshizawa-Fujita, Douglas R. MacFarlane, Patrick C. Howlett, Maria Forsyth, A new Lewis-base ionic liquid comprising a mono-charged diamine structure: A highly stable electrolyte for lithium electrochemistry, Electrochemistry Communications, vol. 8, Issue 3, Mar. 2006, pp. 445-449, ISSN 1388-2481, http://dx.doi.org/10.1016/j.elecom.20.*

(Continued)

*Primary Examiner* — Nicholas P D'Aniello
(74) *Attorney, Agent, or Firm* — Pillsbury Winthrop Shaw Pittman, LLP

(57) ABSTRACT

Embodiments of the invention are related to anion exchange membranes used in electrochemical metal-air cells in which the membranes function as the electrolyte material, or are used in conjunction with electrolytes such as ionic liquid electrolytes.

16 Claims, 2 Drawing Sheets

(56) References Cited

U.S. PATENT DOCUMENTS

2011/0065018 A1* 3/2011 Kim et al. .................. 429/483
2011/0091777 A1 4/2011 Mizuno et al.

FOREIGN PATENT DOCUMENTS

| CN | 102 050 788 A | 5/2011 |
|---|---|---|
| EP | 1 182 196 A1 | 2/2002 |
| EP | 1 398 318 A1 | 3/2004 |
| GB | 1 297 955 A | 11/1972 |
| JP | 2005 026023 A | 1/2005 |
| WO | 20100136783 A1 | 12/2010 |

OTHER PUBLICATIONS

D. Stoica, L. Ogier, L. Akrour, F. Alloin, J-F. Fauvarque, Anionic membrane based on polyepichlorhydrin matrix for alkaline fuel cell: Synthesis, physical and electrochemical properties, Electrochimica Acta, vol. 53, Issue 4, Dec. 31, 2007, pp. 1596-1603, ISSN 0013-4686, http://dx.doi.org/10.1016/j.electacta.2007.03.034.*

K. Scott, Section 2—Membrane Materials, Preparation and Characterisation, In Handbook of Industrial Membranes (Second Edition), edited by K. Scott, Elsevier Science, Amsterdam, 1998, pp. 187-269, ISBN 9781856172332, http://dx.doi.org/10.1016/B978-185617233-2/50005-2. (http://www.sciencedirect.com/science/article/pii/B9781856172332500052).*

Intl. Prel. Report on Patentability dated May 20, 2013 of PCT/US12/43013 filed Jun. 18, 2012 (18 Pages).

Intl Search Report/Written Opinion of PCT/US2012/042955 filed Jun. 18, 2012 dated Sep. 6, 2012 (8 pages).

Yao, C., et al., "Retention characteristics of organic compounds on molten salt and ionic liquid-based gas chromatography stationary phases", Journal of Chromatography, vol. 1216, No. 10, pp. 1658-1712 (Mar. 6, 2009).

Intl. Search Report/Written Opinion dated Sep. 5, 2012 of PCT/US2012/033940 filed Apr. 17, 2012 (11 pages).

Intl Search Report dated Nov. 28, 2012 of PCT/US2012/043013 dated Jun. 18, 2012 (15 pages).

Wang, X., et al., "A polytetrafluoroethylene-guaternanry 1,4-diazabicyclo—[2.2.2]-octane polysulfone composite membrane for alkaline anion exchange membrane fuel cells", Intl. J. Hydrogen Energy, vol. 36 No. 16, pp. 10022-10026 (May 9, 2011).

Yan, X., et al., "Quaternized poly(ether ether ketone) hydroxide exchange membranes for fuel cells", J. Membrane Science, vol. 375, No. 1, pp. 204-211 (Mar. 22, 2011).

Stoica et al., "Anionic membrane based on polyepichlorhydrin matrix for alkaline fuel cell: Synthesis, physical and electrochemical properties", vol. 53, No. 4, pp. 1596-1603 (Oct. 30, 2007).

Park, J-S., "Development of Solid-State Alkaline Electrolytes for Solid Alkaline Fuel Cells", Macromolecular Symposia, vol. 249-250, No. 1, pp. 174-182 (Apr. 1, 2007).

Gu, S., et al., "Soluble and Highly Conductive Ionomer for High-Performance Hydroxide Exchange Membrane Fuel Cells", Angewandte Chemie Intl. Ed., vol. 48, No. 35, pp. 6499-6501 (Aug. 17, 2009).

Intl. Search Report/Written Opinion dated Dec. 3, 2012 of PCT/US2012/043000 filed Jun. 18, 2012 (15 pages).

Intl. Prel. Report on Patentability dated Jan. 17, 2014 of PCT/US12/43000 filed Jun. 18, 2012 (9 pages).

U.S. Office Action dated Jun. 5, 2014 for U.S. Appl. No. 13/526,058.

Chinese Office Action dated Feb. 9, 2015 for Appln. No. 2012800247268.

* cited by examiner

METAL-AIR CELL WITH ION EXCHANGE MATERIAL

REFERENCE TO PRIOR APPLICATIONS

This application claims priority to U.S. provisional application No. 61/498,308 filed 17 Jun. 2011 and U.S. provisional application No. 61/568,875 filed 9 Dec. 2011.

GOVERNMENT FUNDING SUPPORT

This invention was made with U.S. government support under Contract No. DB-AR-0000038 awarded by the Department of Energy. The government has certain rights in the invention.

FIELD OF THE INVENTION

Embodiments of the invention are related to electrochemical metal-air cells using an ion exchange material to facilitate ion transfer between the electrodes, or to assist the ion conductive medium in ion transfer.

BACKGROUND

A significant detriment to the energy density of most batteries is posed by the battery's cathode. This is true for battery chemistries using, for example, lithium or nickel. Typically, oxidant is stored at the cathode at a molar charge capacity that is two to five times lower than that of the anode. Many fuel cells, on the other hand, use oxygen from the air as a source of oxidant. The existence of a continuous and virtually limitless oxidant source enables, in principle, high energy density. However, the use of hydrogen and organic fuels precludes high energy efficiencies due to problems with vapor pressure and balance-of-systems complexity, such as humidification and membrane issues. Metal-air electrochemical cells are able to combine the ultra-high anode capacity of batteries with the air-breathing cathode of fuel cells in order to achieve substantial energy densities that are relevant to modern energy demands.

Metal-air batteries typically include a fuel electrode at which metal fuel is oxidized, an air electrode at which oxygen is reduced, and an electrolyte for providing ion conductivity. A limiting factor with conventional metal-air batteries is the evaporation of the electrolyte solution (i.e., the ionically conductive medium), particularly the evaporation of the solvent, such as water in an aqueous electrolyte solution. Because the air electrode is required to be air permeable to absorb oxygen, it also may permit the solvent vapor, such as water vapor, to escape from the cell. Over time, the cell becomes incapable of operating effectively because of the depletion of the solvent. Indeed, in many cell designs this evaporation issue renders the cell inoperable before the fuel is consumed. The evaporation issue is exacerbated in secondary (i.e., rechargeable) cells, because the fuel may be re-charged repeatedly over the life of the cell, whereas the electrolyte solution cannot (absent replenishment from an external source).

There are other problems associated with conventional aqueous electrolyte batteries, such as water electrolysis during recharging, and self discharge. During recharge, a current is passed through the battery to reduce the oxidized fuel at the fuel electrode. Some of the current, however, electrolyzes the water resulting in hydrogen evolution (reduction) at the fuel electrode and oxygen evolution (oxidation) at the oxygen electrode as represented in the following equations:

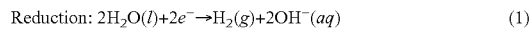

Reduction: $2H_2O(l)+2e^- \rightarrow H_2(g)+2OH^-(aq)$ (1)

and

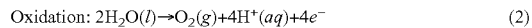

Oxidation: $2H_2O(l) \rightarrow O_2(g)+4H^+(aq)+4e^-$ (2)

In this manner, further aqueous electrolyte is lost from the battery. Additionally, the electrons that are consumed in reducing hydrogen are not available to reduce the fuel oxide. Therefore, the parasitic electrolysis of the aqueous electrolyte reduces the round trip efficiency of the secondary battery.

Self-discharge may result from impurities in the electrodes or reaction with the electrolyte. Typically, self-discharge from impurities in the electrodes is small (2-3% loss per month). The reaction of an active metal with water and/or $O_2$ dissolved in the water, however, may be quite high (20-30% per month).

To compensate for these problems, metal-air batteries with aqueous electrolyte solutions are typically designed to contain a relatively high volume of electrolyte solution. Some cell designs even incorporate means for replenishing the electrolyte from an adjacent reservoir to maintain the electrolyte level. However, either approach adds to both the overall size of the cell, as well as the weight of the cell, without enhancing the cell performance (except to ensure that there is a significant volume of electrolyte solution to offset evaporation of the water or other solvent over time). Specifically, the cell performance is generally determined by the fuel characteristics, the electrode characteristics, the electrolyte characteristics, and the amount of electrode surface area available for reactions to take place. But the volume of electrolyte solution in the cell generally does not have a significant beneficial effect on cell performance, and thus generally only detracts from cell performance in terms of volumetric and weight based ratios (power to volume or weight, and energy to volume or weight). Also, an excessive volume of electrolyte may create a higher amount of spacing between the electrodes, which may increase ohmic resistance and detract from performance.

The use of non-aqueous systems for electrochemical cells has been suggested (see e.g., U.S. Pat. No. 5,827,602). In non-aqueous systems, the aqueous electrolyte may be replaced with an ionic liquid. Ionic liquids which contain a strong Lewis acid such as $AlCl_3$, however, are known to liberate toxic gases when exposed to moisture.

The use of low or room temperature ionic liquid rather than an aqueous electrolyte in a metal-air electrochemical cell, are described in U.S. Provisional Application Ser. Nos. 61/383,510, filed Sep. 16, 2010; 61/355,081, filed Jun. 15, 2010; 61/334,047, filed May 12, 2010; 61/329,278, filed Apr. 29, 2010; 61/177,072, filed May 11, 2009, and 61/267,240, filed Dec. 7, 2009, and described in U.S. patent application Ser. No. 13/105,794, filed on May 11, 2011; Ser. No. 13/096,851, filed Apr. 28, 2011; Ser. No. 13/085,714, filed Apr. 13, 2011; and Ser. No. 12/776,962, filed May 10, 2010, the disclosures of each of which are incorporated herein by reference in their entirety. The use of a low or room temperature ionic liquid in the cell essentially eliminates the problems associated with evaporation of solvent from an electrolytic solution.

Room temperature ionic liquids have extremely low vapor pressures (some have vapor pressures that are essentially immeasurable under standard conditions) and thus experience little or no evaporation. Therefore, cells using low or room temperature ionic liquids as their ionically conductive media need not incorporate excessive volumes of solution in order to compensate for evaporation over time. Relatively small amounts of ionic liquid are sufficient to support the electrochemical reactions needed for cell operation, thereby reducing cell weight and volume and increasing power to volume/weight ratios. Also, other problems associated with solvents, such as hydrogen evolution in an aqueous solution, may be avoided.

Other problems exist in metal-air rechargeable batteries. For example, dendrites sometimes may form at the air electrode due to the diffusion of zinc and zinc hydroxides (e.g., zincate ($Zn(OH)_4^{2-}$)) within the battery. Dendrites form from the growth of zinc (or other metals) in needle or branch-like structures into the electrolyte between the anode and the cathode. This type of growth during charging may cause the zinc to penetrate through the pores in a porous separator, which may cause short circuiting and battery failure when the zinc contacts the air electrode.

Catalysts or impurities from the air electrode may leach into the electrolyte, which may cause gassing at the metal electrode and degrade the performance of the battery. This leaching, if persistent over time, may eventually cause the air electrode to break down. It would be desirable to maintain the stability of the catalysts and any impurities so that they remain at the air electrode so that the air electrode remains intact over the life of the battery, and to the extent that any catalysts or impurities do become separated from the air electrode, to prevent them from being transported to the metal electrode to reduce the tendency of gassing at the metal electrode.

Conventional porous polymeric separators, as well as many solid polymer electrolytes, often allow zinc and zincate to diffuse between the metal electrode and the air electrode. Zincate ions are very soluble in alkaline electrolytes such as KOH, and will diffuse though a porous separator. In some cases with high zincate concentrations on the air electrode side of the separator, deposits of zinc oxide may occur once the solubility concentration of zincate is reached and the ZnO begins to precipitate. The solubility of zincate is closely linked to the $OH^-$ concentration, and one possible explanation for the deposition may be that $OH^-$ concentration varies during charge and discharge on the air electrode. Zincate deposition on the air electrode can cause failure of the battery.

The use of anion (or in general ion) exchange membranes in electrochemical power generation applications is known. Known anion exchange membranes used in electrochemical power generation applications are described in, for example, Gu, et al., "A Soluble and Highly Conductive Ionomer for High Performance Hydroxide Exchange Membrane Fuel Cells," *ACIE*, pp. 1-4 (2009); Hwang, et al., "Preparation of anion-exchange membrane based on block copolymers . . . ", *J. Membrane Sci.*, 140, pp. 195-203 (1998); and Agel, et al., "Characterization and Use of Anionic Membranes for Alkaline Fuel Cells," *J. Power Sources*, 101, pp. 267-274 (2001). These documents describe conventional membranes, such as chloromethylpolysulfone polymers, derivatized with certain functional groups (e.g., triarylphosphine or triethylamine).

Surrounding the cathode or anode with an ion exchange polymeric film also is known and described, for example, in U.S. Pat. Nos. 4,333,993 and 4,975,172. It has been proposed to incorporate ion exchange materials in metal/oxygen cells for a variety of purposes. As one example, U.S. Pat. No. 4,137,371 utilizes an ion-exchanging membrane as a zincate restricting membrane to prevent poisoning of the electrochemically active material in a zinc/oxygen cell. The ion-exchanging membrane is joined directly to the oxygen electrode and is positioned between the porous layer of this electrode and the zinc electrode. U.S. Pat. No. 3,514,336 describes an electrochemical cell which utilizes an ion exchange resin matrix having macroporous channels containing a free electrolyte in the channels that is disposed between the anode and cathode. When used in a fuel cell, such matrix is said to act as mixed current carriers so that the resins cannot dehydrate as a result of endosmotic transport, thus providing an electrolyte which remains homogenous. A further use of ion-exchange materials is described in U.S. Pat. No. 3,097,115 wherein natural and synthetic zeolites are utilized to form electrodes for fuel cells. The electrodes are formed, by, in general, shaping the electrode as desired, ion exchanging the naturally occurring ions from the zeolite with the desired activating metallic exchange properties. U.S. Pat. No. 3,097,116 discloses forming an electrode structure by bonding the heat stabilized, ion exchange zeolite to a gas diffusion membrane, which membrane may be either hydrophilic or hydrophobic.

U.S. Pat. No. 5,798,180 discloses a battery separator (or coating on an electrode) comprised of a polyaromatic ether, such as sulfonated poly(2,6-dimethyl-1,4-phenylene oxide). Other known battery separators include Nafion™, commercially available from DuPont, Wilmington, Del., (a sulfonated polytetrafluoroethylene), fluorosulfonated Teflon®, polyethylene separators available from Daramic, Charlotte, N.C., and polypropylene and polyethylene separators available from Celgard, Charlotte, N.C. Metal-air batteries, electrochemical devices, and/or fuel cells containing ion-exchange membranes as part of an electrode, or as a battery separator also are disclosed in U.S. Patent Application Publication Nos. 2004/0157101, 2008/0008937, 2010/0137460, and 2011/0027666, the disclosures of which are incorporated by reference herein in their entireties. There is a need to provide improved ion exchange materials for use in metal-air rechargeable batteries.

SUMMARY OF THE INVENTION

An embodiment of the invention relates to a metal-air cell comprising a fuel electrode for oxidizing a fuel, an air electrode configured to absorb and reduce gaseous oxygen, and an electrolyte that includes an ionic exchange material comprising an ionomer. Another embodiment of the invention relates to an ionically conductive medium for use in an electrochemical cell comprising a fuel electrode and an air electrode for absorbing and reducing gaseous oxygen, comprising: an ionic exchange material comprising a solid ionomer, a salt, and optionally, one or more additives.

Another embodiment of the invention relates to an ionic exchange material comprising a polymer comprising ketone or sulfone groups derivatized with 1,4-diazabicyclo[2.2.2]octane (DABCO). Another embodiment of the invention relates to an electrochemical cell comprising a cathode, an anode, and a solid electrolyte comprising a polymer comprising ketone or sulfone groups derivatized with 1,4-diazabicyclo[2.2.2]octane (DABCO). An additional embodiment relates to an ionic exchange material comprising a polymer derivatized with a cation, a salt, and an ionic pair comprised of a cation, which may be the same or different than the cation attached to the polymer, and an anion. Additional embodiments include ionic exchange materials comprising a polymer derivatized with a cation, and salts thereof, methods of making any of the ionic exchange materials described above, and electrochemical cells comprising a cathode, an anode, and an electrolyte containing at least the ionic exchange materials described herein.

Other objects, aspects, and advantages of the present invention will become apparent from the following detailed description, the accompanying drawings, and the appended claim.

BRIEF DESCRIPTION OF THE DRAWINGS

The invention may best be understood by referring to the following description and accompanying drawings that are used to illustrate embodiments of the invention.

DETAILED DESCRIPTION

Figure 1:
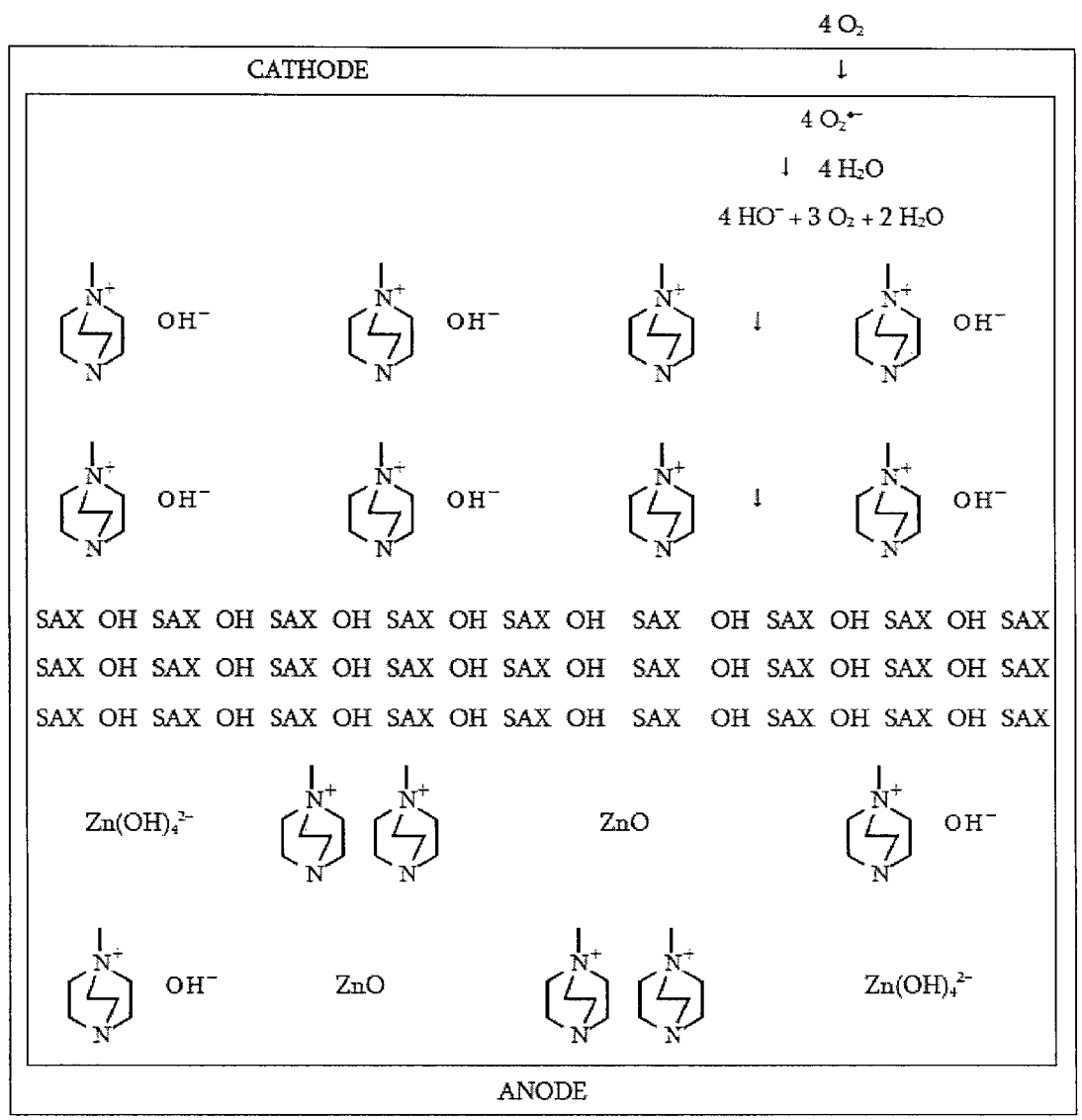
FIG. 1 is a schematic diagram of an air electrode, a fuel electrode, and an ion exchange material (membrane) according to an embodiment of the invention.

According to an embodiment, an ionic exchange material comprising a polymer derivatized with a cation is a solid electrolytic component of any electrochemical cell. According to another embodiment, an ionic exchange material comprising a polymer comprising ketone or sulfone groups derivatized with 1,4-diazabicyclo[2.2.2]octane (DABCO) is a solid electrolytic component of any electrochemical cell, including but not limited to a fuel cell, a metal-air battery, an $O_2$ separator, a chloralkali cell, or an electrolyzer.

According to another embodiment, a metal-air battery includes an ion exchange material that is intended to help address challenges relating to undesirable material transport within the battery. According to one embodiment, the ion exchange material may be provided in the form of a separator or membrane, or may be included within a conventional separator. According to other embodiments, the ion exchange material may be provided as a film or membrane that is applied to (e.g., laminated on) the surface of an air electrode. According to other embodiments, the ion exchange material may be mixed with the materials used to form one or more layers of the air electrode (e.g., one or more layers of the active layer or gas diffusion layer of the air electrode) so that the ion exchange materials are incorporated directly within the air electrode. According to other embodiments, the ion exchange material may be positioned within a liquid electrolyte to serve as a separator, in which the liquid electrolyte may comprise an alkaline solution, or an ionic liquid. It should be understood that any combination of the foregoing may also be used according to various other exemplary embodiments.

For example, a metal-air battery may include both an ion exchange material provided on the surface of an air electrode in addition to having one or more layers of the air electrode itself including an ion exchange material incorporated therein. In addition, a metal-air battery may include an ion exchange material on the surface of an air electrode, as well as an ion exchange material that serves as a separator, with or without a liquid electrolyte. In the absence of liquid electrolyte, the ionomer may function as the sole electrolyte, and the metal-air battery in this embodiment will function in the solid state. In other embodiments, the ionically conductive medium may comprise a liquid/solid mixture, wherein the liquid electrolyte and solid ionomer are present in varying concentrations. Other possibilities and combinations will be apparent to those having ordinary skill in the art, upon reviewing the present disclosure, and all such possibilities are intended to be included within the scope of the present disclosure.

There are a number of advantages associated with the use of a solid ionomer as the electrolyte in a metal-air battery. For example, non-limiting possible advantages are preventing gas evolution from inside of the cathode and ZnO precipitation in the cathode; applying the membrane to the anode prevents significant quantities of Zn cations from migrating into a bulk electrolyte, helping to slow down anode shape change, densification and dendritic shorting; using the solid ionomer essentially alone as the electrolyte prevents the need for liquid electrolyte, which can evaporate and reduce the useful life of the cell; and allowing the cell to be more compact.

The electrochemical device may have any desired configuration, including, but not limited to, coin or button cells, prismatic cells, cylindrical cells (e.g., AA, AAA, C, or D cells in addition to other cylindrical configurations), flow cells, fuels cells, etc. Further, the metal-air battery may be a primary (disposable, single-use) or a secondary (rechargeable) battery. Rechargeable metal-air batteries are available due to the development of bifunctional air electrodes and the utilization of rechargeable anode materials.

Various advantages may be obtained by incorporating the ion exchange membrane described herein into a metal-air battery. For example, the presence of an ion exchange membrane may advantageously reduce or prevent migration of $Zn(OH)_4^{2-}$ toward the air electrode, thus reducing the tendency to form dendrites that may cause short circuits within the cell between the metal electrode and the air electrode. Limiting the zincate diffusion may provide more even depositions through the bulk of the Zn electrode, fewer surface reactions, and thus fewer tendencies for dendrites and shape changes. The ion exchange membrane also may mitigate or prevent the leaching of catalysts or impurities from the air electrode to the metal electrode, thus reducing the tendency of the metal electrode to experience undesirable gassing that may degrade the performance of the battery over time. According to certain embodiments, the ion exchange membrane also may help to prevent breakdown of the air electrode and to assist in the maintenance of a stable three phase boundary at the air electrode.

For the purposes of this application, a low temperature ionic liquid is defined as an ionic liquid having a melting point at or below 150° C. at 1 atm. These low temperature ionic liquids may also include the species known as room temperature ionic liquids, which are defined as ionic liquids having a melting point at or below 100° C. at 1 atm. Ionic liquids are also referred to as liquid salts. By definition, an ionic liquid is composed primarily of anions and cations of the salt. While an ionic liquid itself may be a solvent with respect to one or more other soluble products present in the ionic liquid, such as an additive or reactant by-product created by operation of the cell, an ionic liquid does not require the use of a solvent to dissolve the salt, as the liquid itself is "self-dissolving," i.e., it is a liquid of the electrolyte salt anions and cations by its own nature, and the use of a separate solvent to dissolve the salt is not needed.

However, even though low temperature or room temperature ionic liquids are defined by their respective melting points at 1 atm., in some embodiments the cell may be operated in an environment with a different pressure, and thus the melting point may vary with the operating pressure. Thus, reference to a melting point at 1 atm. is used as a reference point to define these liquids, and does not imply or restrict its actual use conditions in operation.

In some non-limiting embodiments, a substance that may be regarded in some contexts as a solvent may be added in relatively small amounts to the ionic liquid, either for enhancing the solubility of solutes in the ionic liquid, such as an additive added to or a by-product created in the ionic liquid by operation of the cell, or for providing a non-solvent functionality, such as the promotion of certain electrochemical reactions or transport of ions. Thus, the use of an ionic liquid does not entirely exclude the presence of a substance that may be regarded as solvent in other contexts, or act as a solvent with respect to solutes in the ionic liquid, but because a solvent is not needed to dissolve an ionic liquid, it can be used in a substantially smaller amount compared to conventional electrolyte salts requiring a bulk solvent for dissolution of the salt per se, such as aqueous electrolyte solutions. Indeed, in some non-limiting embodiments it is possible that no additive solvent is used.

In some non-limiting embodiments, the ionically conductive medium between the fuel and air electrodes may be a pure low temperature ionic liquid, i.e., it consists of the ionic liquid. In other non-limiting embodiments, it may consist essentially of the ionic liquid, meaning for the purposes of this application that it may include the ionic liquid and one or more other substances that do not materially affect its characteristic of being an ionic liquid. Of course, any presence of reaction by-products or ions in the ionic liquid would be permitted in either the embodiments consisting of the ionic liquid or the embodiments consisting essentially of the ionic liquid, as the very nature of the ionic liquid is to promote the transport and/or formation of such ions and/or by-products. The terms "solvent free" or "devoid of solvent" may be used to characterize the ionic liquid, and this terminology should be understood as (a) only excluding a bulk solvent that is provided for purposes of dissolving the ionic liquid, and not excluding the ionic liquid itself, which may act as a solvent with respect to another substance (e.g., an additive or the cell reaction by-products); and (b) not excluding the presence of one or more additives to enhance the ionic transport functionality of the ionic liquid, support the electrochemical reactions of the cell and/or enhance the solubility of solutes in the ionic liquid, even if such an additive theoretically could be regarded as a solvent in other contexts or with respect to solutes in the ionic liquid, but is not functioning for purposes of dissolution of the ionic liquid (for example, in some embodiments, water in the 10-100 ppm range may be used to promote the electrochemical reactions by increasing proton availability for supporting the oxygen reduction reaction, but the water is not functioning as a solvent with respect to the ionic liquid, although it may function as a solvent in other types of electrolytes, namely aqueous electrolytes).

Ionic liquids generally refer to salts that form stable liquids comprising ions. That is, ionic liquids are fully dissociated, consisting essentially of negative and positive ions. Thus, ionic liquids inherently conduct electricity. Further, ionic liquids have negligible vapor pressure, low viscosity, wide liquid ranges (up to 400° C.), high thermal stability, and a large electrochemical window (>5V). Because of these properties, ionic liquids typically will not evaporate or be consumed during the charge/discharge cycle of an electrochemical cell.

Ionic liquids generally exist in two forms: protic and aprotic. Protic ionic liquids have available protons which may be oxidized or reduced or may coordinate with negative ions, such as reduced oxygens. Some examples of protic ILs are synthesized from combinations of anions tetrachloroaluminate, bis(trifluoromethylsulfonyl)imide, methylsulfonate, nitrate, and acetate, and cations triethylammonium, diethylmethylammonium, dimethylethylammonium, dimethylethylammonium triflate, ethylammonium, α-picolinium, pyridinium, and 1,8-bis(dimethylamino)naphthalene, 2,6-di-tert-butylpyridine, and derivatives of the guanidines. Aprotic ionic liquids, however, generally do not have proton activity. Some examples of aprotic room temperature ionic liquids are synthesized from combinations of anions selected from chloride ($Cl^-$), hexafluorophosphate ($PF_6^-$), iodide, tetrafluoroborate, bis(trifluoromethylsulfonyl)imide ($C_2F_6NO_4S_2^-$) (TFSI), trifluoromethanesulfonate ($CF_3O_3S^-$), and cations selected from imidazolium, sulfonium, pyrrolidinium, quaternized ammonium or phosphonium and their derivatives. Despite a lack of proton activity, an aprotic ionic liquid can comprise a proton. For example, an aprotic ionic liquid can comprise at least one cation that has at least one strongly bound proton thereto. Many other options of ionic liquids exist, and these lists of examples are not intended to be limiting in any way.

Any of the ionic liquids disclosed in the art may be used in the embodiments. Suitable ionic liquids are disclosed in, for example, in U.S. Pat. Nos. 4,892,944, 5,826,602, 5,865,513, 7,605,297, 7,863,458, and 7,960,061, the disclosure of which is incorporated by reference herein in its entirety. In addition, any of the ionic liquids disclosed in co-pending Provisional Application Ser. Nos. 61/383,510, filed Sep. 16, 2010; 61/355,081, filed Jun. 15, 2010; 61/334,047, filed May 12, 2010; 61/329,278, filed Apr. 29, 2010; 61/177,072, filed May 11, 2009, and 61/267,240, filed Dec. 7, 2009, and described in U.S. patent application Ser. No. 13/105,794, filed on May 11, 2011; Ser. No. 13/096,851, filed Apr. 28, 2011; Ser. No. 13/085,714, filed Apr. 13, 2011; and Ser. No. 12/776,962, filed May 10, 2010. Using the guidelines provided herein, those skilled in the art will be capable of preparing an electrochemical cell containing an ionic liquid together with the ion exchange membrane described herein.

In one embodiment, the ion exchange material comprises a polymer backbone derivatized with cations to provide an ion exchange material, more specifically, an anionic-exchange material capable of functioning as an electrolyte to transport anions across its surface. Any of a variety of polymers can be used as the backbone, including, for example, one or more polymers selected from the group consisting of polyether, polysulfone, polyetherether ketone (PEEK), polyphenylsulfone, polyphenylene, polystyrene, copolymers, blends of one or more polymer or blends with polyvinyl alcohol, blends with a non-ionic polymer, crosslinked matrices, and mixtures thereof. According to one embodiment, the polymer is selected from one or more polymers comprising ketone and/or sulfone groups, as well as copolymers, blends, cross-linked polymers, and mixtures thereof.

The cations suitable for derivatizing the aforementioned polymeric materials include any known cations useful as charge-transfer centers in electrochemical cells, or mixtures and combinations thereof. Suitable cations include, for example, one or more cations selected from tetraalkylammoniums, tetraalkylphosphoniums, trialkylsulfoniums, imidazoliums, pyridiniums, pyrrolidiniums, morpholiniums, phosphiniums, phosphoriniums, phospholiniums, piperidiniums, piperaziniums, quinuclidiniums, bicyclic ammoniums, amidiniums, guanidiniums, alkanolaminiums, monoalkylammoniums, dialkylammoniums, trialkylammonium, imidazoliums, pyrazoliums, triazoliums, thiazoliums, oxazoliums, pyridiniums, imidazopyridiniums, imidazopyrimidines, monoalkylphosphiniums, dialkylphosphoniums, trialkylphosphoniums, monoalkylphosphoniums, dialkylphosphoniums, trialkylphosphoniums, phosphorus monoammoniums, phosphorus diammoniums, phosphorus triammoniums, thiopheniums, dihydrothiopheniums, tetrahydrothiopheniums, dialkylsulfoxoniums, diazabicyclo compounds, and combinations thereof. The above-mentioned polymers can be derivatized with one or more of the above-mentioned cations using the techniques described herein. Those skilled in the art, upon reading the present specification, will be capable of making an ionic exchange material comprising a polymer derivatized with a cation. According to an embodiment, the ionic exchange material comprises a polymer comprising ketone or sulfone groups derivatized with 1,4-diazabicyclo [2.2.2]octane (DABCO).

The present inventors have discovered that a variety of polymers, and specifically, polymers with ketone and sulfone groups can be easily chlorinated or chloromethylated at sites on the polymer chain that are separate from the sites containing ketone and sulfone groups (or other groups containing a double-bonded oxygen or other double bond such as in polyphenylene or polystyrene). The ability to more densely chlorinate or methylchlorinate polymeric ionic exchange building blocks provides more sites to replace the chlorine with a cation, such as 1,4-diazabicyclo[2.2.2]octane (DABCO), 3-dimethylamino-2,2-dimethyl-1-propanol (alkynolamine), and 1,1,2,3,3, pentamethyl guanidine (PMG), thereby derivatizing the polymeric building blocks with a material that permits anions (e.g., hydroxyl ions) to move across the membrane, while excluding cations (e.g., zinc and zincate) from moving the other way. An exemplary embodiment of an electrochemical cell utilizing such a membrane, derivatized with DABCO, is shown in FIG. 1.

As shown in FIG. 1, the ion exchange membrane, SAX, is positioned between the air electrode, or cathode, and the metal electrode, or anode. Hydroxyl ions (OH⁻) generated as a result of a reduction of oxygen in the ambient air at the cathode, are capable of moving across the ion exchange membrane due the presence of the DABCO cation derivatized on the polymeric backbone, but zinc or zincate ions do not move across from the anode to the cathode side. The ion exchange membrane therefore prevents the formation of dendrites and other undesirable ion formation at the cathode side of the cell, and consequently, preserves its function and utility. As stated previously, the ion exchange membrane may be used in conjunction with an electrolyte, which may be positioned within the pores of the membrane or positioned on either side of the membrane (in which case the membrane functions as a separator), and optionally in conjunction with a separator.

Figure 2:
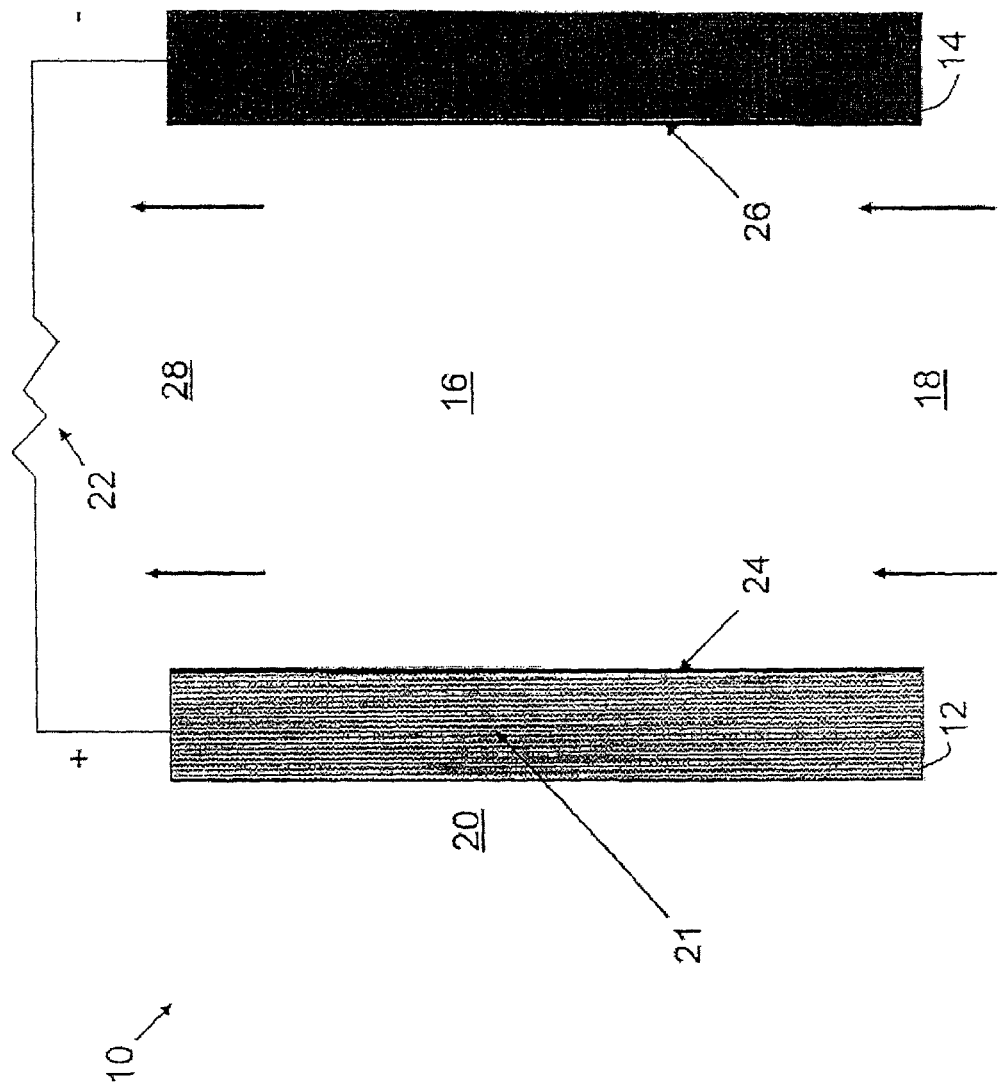
FIG. 2 is a schematic diagram of an electrochemical cell according to an embodiment of the invention.

The electrolyte, shown as numeral 18 in FIG. 2, may be potassium hydroxide or other hydroxyl ion-conducting materials, as well as an ionic liquid. As shown generally in FIG. 2, the electrolyte 18 is positioned substantially between the metal electrode 12 and the air electrode 14 according to an exemplary embodiment. It is preferred that electrolyte 18 be included within pores of the polymer exchange material, and that both together are referenced herein as "electrolyte 18." The electrolyte 18 (e.g., potassium hydroxide ("KOH") or other hydroxyl ion-conducting media) is not consumed by the electrochemical reaction within the battery 10, but, rather, is configured to provide for the transport of hydroxyl ions ("OH⁻") from the air electrode 14 to the metal electrode 12 during discharge, and, where the battery 10 is a secondary system, to provide for transport of hydroxyl ions from the metal electrode 12 to the air electrode 14 during charge. The electrolyte 18 may be positioned within some of the pores of the metal electrode 12 and some of the pores of the air electrode 14. According to other exemplary embodiments, the distribution and location of the electrolyte may vary (e.g., the electrolyte may be disposed in the pores of the metal electrode and not the pores of the air electrode, etc.). According to an exemplary embodiment, the electrolyte 18 is an alkaline electrolyte used to maintain high ionic conductivity between the metal electrode and the air electrode. According to other exemplary embodiments, the electrolyte may be any electrolyte that has high ionic conductivity and/or high reaction rates for the oxygen reduction/evolution and the metal oxidation/reduction (e.g., NaOH, LiOH, etc.). According to still other embodiments, the electrolyte may include salt water or other salt-based solutions that give sufficient conductivity for the targeted applications (e.g., for marine/military applications, etc.). Most preferably, the electrolyte, if used, is an ionic liquid.

The ion exchange material preferably is comprised of a polymeric film having a variety of thicknesses that can either be used as a separator, together with a separator, together with electrolyte or having electrolyte material positioned within its pores, or can be positioned around the air electrode 12 or metal electrode 14. The ion exchange membrane useful in one embodiment is comprised of a polymer backbone containing sulfone or ketone groups, derivatized with DABCO, in which the DABCO is attached to a phenyl group positioned away from the sulfone or ketone moiety.

One preferred ion exchange membrane is DABCO-derivatized polychloromethylsulfone. Derivatization of polychloromethylsulfone with DABCO preferably proceeds in accordance with the following reaction:

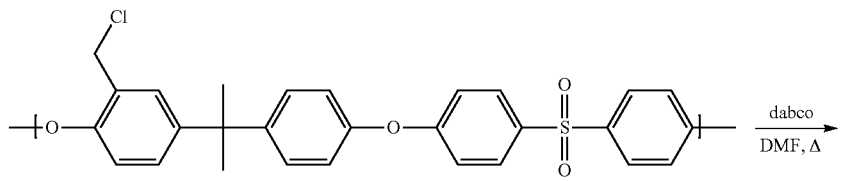

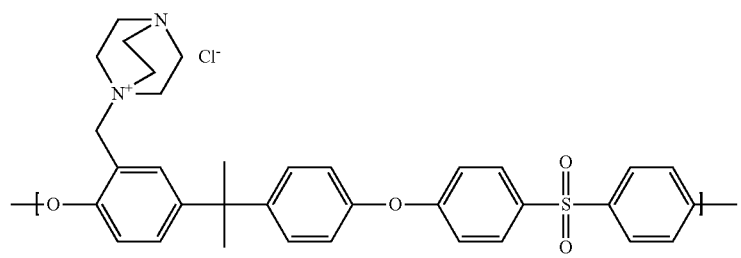

Polysulfones containing chloromethyl groups are known cation exchangers, as described, for example, in U.S. Pat. No. 5,128,378, the disclosure of which is incorporated by reference herein in its entirety. Beginning with this known ion exchange membrane, the membrane may be derivatized with DABCO by contacting the chloromethyl polysulfone with DABCO, in the presence of dimethyl formamide at suitable reaction conditions. For example, a DABCO-derivatized polysulfone may be prepared by immersing the membrane in a DMF solution containing an excess of DABCO (e.g., 1 wt % to about 25 wt %), at a temperature within the range of from about 25° C. to about 125°, or from about 45° C. to about 95° C., or from about 50° C. to about 80° C., for anywhere from about 1 hour to about 48 hours, or from about 5 hours to about 35 hours, or from about 12 hours to about 20 hours. Unreacted DABCO can be removed.

A similar reaction can proceed with polyether ether ketone (PEEK), in which PEEK is initially chloromethylated, and then derivatized with DABCO, as shown below:

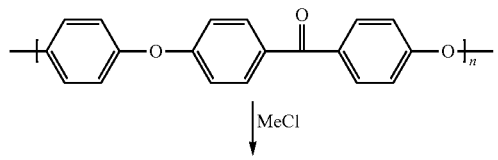

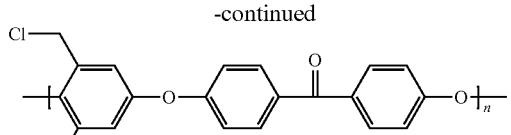

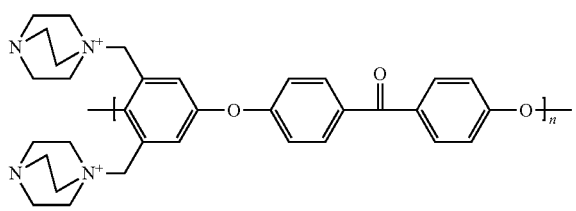

As an alternative to derivatizing a ketone and/or sulfone containing polymeric backbone, bisphenol A may be chloromethylated under suitable conditions similar to those described above to produce a densely chloromethylated polysulfone or polyether ether ketone, and then derivatized with DABCO as shown in the following reaction sequences:

Bisphenol A to Derivatized Peek

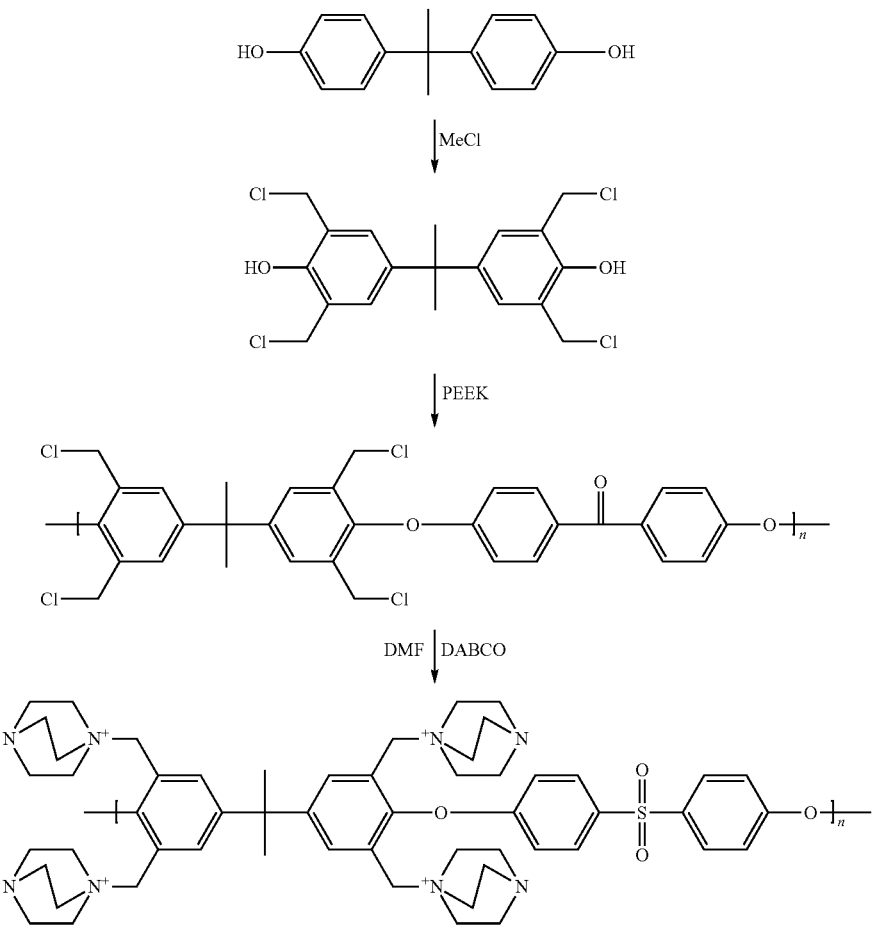

Bisphenol A to Derivatized Polysulfone

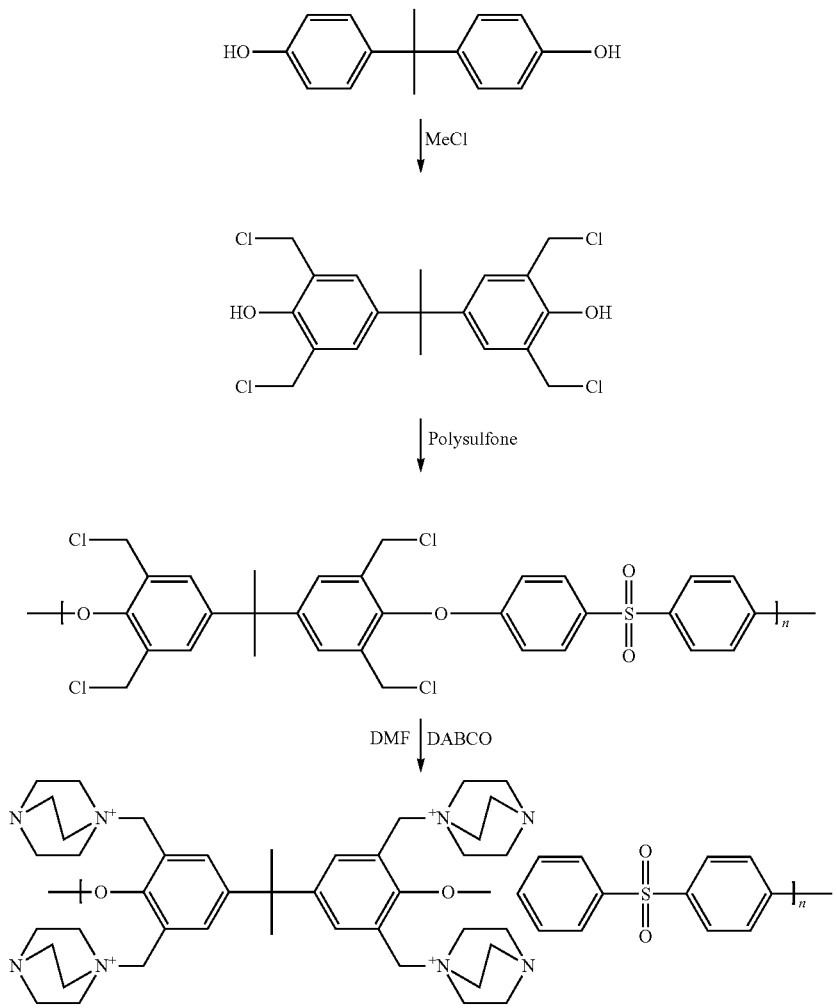

In the above equations, n is an integer that may vary widely from about 1 to about 100,000, or from about 10 to about 50,000, or from about 25 to about 10,000. The use of bisphenol A to derivatize ketone or sulfone-containing polymers provides for a more densely derivatized exchange polymer, and consequently, provides for greater ionic transport across the polymer backbone via the pendant quaternized DABCO moieties. Such a densely derivatized membrane improves battery efficiency and performance, as well as other desirable characteristics attributable to the use of a solid electrolyte material.

Other cations can be suitably attached to other polymer backbones using the same procedure as described above for the derivatization of polymers containing ketone or sulfone groups with DABCO. For example, a polyphenylsulfone, polyphenylene, or polystyrene may be derivatized with a cation selected from tetraalkylammoniums, tetraalkylphosphoniums, trialkylsulfoniums, imidazoliums, pyridiniums, pyrrolidiniums, morpholiniums, phosphiniums, phosphoriniums, phospholiniums, piperidiniums, piperaziniums, quinuclidiniums, bicyclic ammoniums, amidiniums, guanidiniums, alkanolaminiums, monoalkylammoniums, dialkylammoniums, trialkylammonium, imidazoliums, pyrazoliums, triazoliums, thiazoliums, oxazoliums, pyridiniums, imidazopyridiniums, imidazopyrimidines, monoalkylphosphiniums, dialkylphosphoniums, trialkylphosphoniums, monoalkylphosphoniums, dialkylphosphoniums, trialkylphosphoniums, phosphorus monoammoniums, phosphorus diammoniums, phosphorus triammoniums, thiopheniums, dihydrothiopheniums, tetrahydrothiopheniums, dialkylsulfoxoniums, and combinations thereof. The derivatization may take place by chlorinating the polymer backbone by reaction with an alkyl chloride, preferably methyl chloride to form a chloromethyl derivatized polymer, and then contacting the chloromethyl polymer with the cation, in the presence of dimethyl formamide at suitable reaction conditions. For example, a pentamethyl guanidinium-derivatized polymer may be prepared by immersing the polymer membrane in a DMF solution containing an excess of 1,1,2,3,3, pentamethyl guanidine (PMG) (e.g., 1 wt % to about 25 wt %), at a temperature within the range of from about 25° C. to about 125°, or from about 45° C. to about 95° C., or from about 50° C. to about 80° C., for anywhere from about 1 hour to about 48 hours, or from about 5 hours to about 35 hours, or from about 12 hours to about 20 hours. Unreacted PMG can be removed.

In another embodiment, polychloromethylsulfone is derivatized with 3 dimethylamino-2,2-dimethyl-1-propanol (alkynolamine) to provide a polymeric exchange material having the following formula:

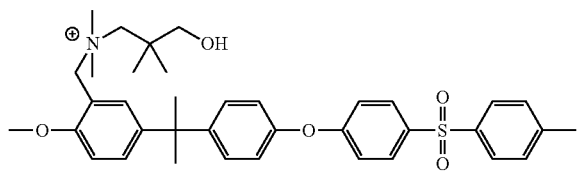

where n is an integer of from about 1 to about 100,000.

A similar reaction can proceed with polyether ether ketone (PEEK), in which PEEK is initially chloromethylated, and then derivatized with PMG as described above with respect to DABCO, to produce the following polymeric exchange material:

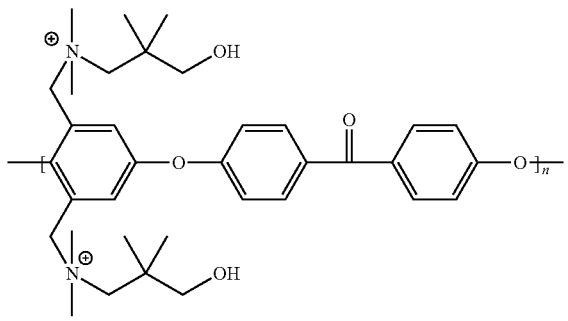

where n is an integer of from about 1 to about 100,000.

The same procedure described above for Bisphenol A to derivatized polysulfone and PEEK can be used to make the following polymeric exchange materials derivatized with alkynolamine.

where n is an integer of from about 1 to about 100,000 in both polymeric exchange materials.

In another embodiment, polychloromethylsulfone is derivatized with pentamethyl guanidine to provide a polymeric exchange material having the following formula:

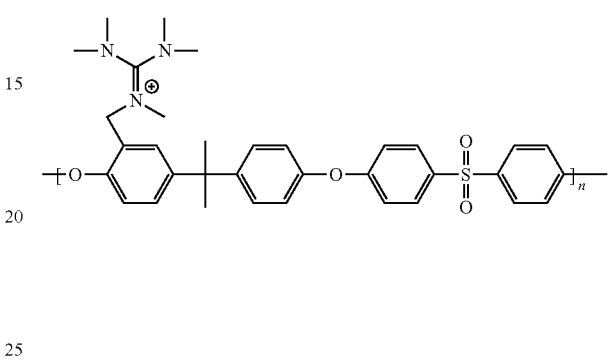

where n is an integer of from about 1 to about 100,000. The inventors have found that PMG can be annexed to a polymer backbone by first reacting tetramethylguanidine (TMG) with a chlorinated polymer, such as chloromethylpolysulfone (CMPSU), to form a neutral polymer-tethered TMG. This neutral polymer-tethered TMG then can be reacted with a dialkyl sulfate to form a polymer-tethered PMG due to the addition of the methyl group, and formation of a positive charge on the nitrogen. The reaction sequence proceeds as follows:

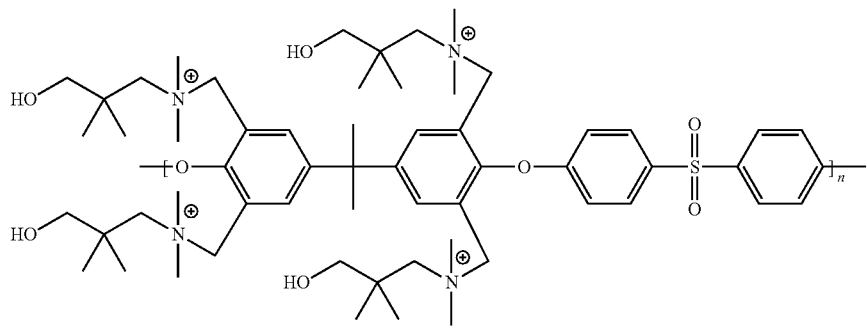

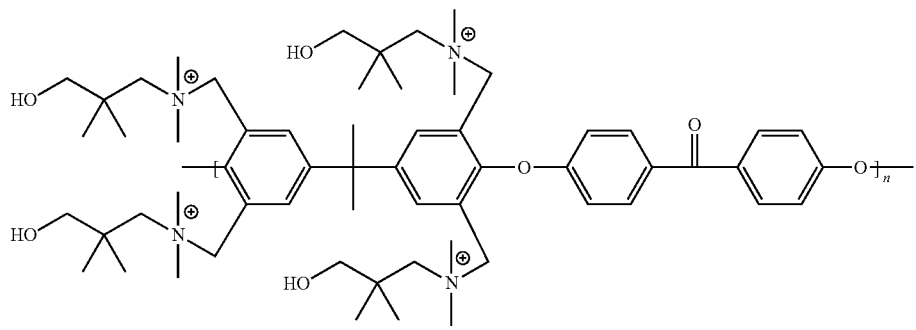

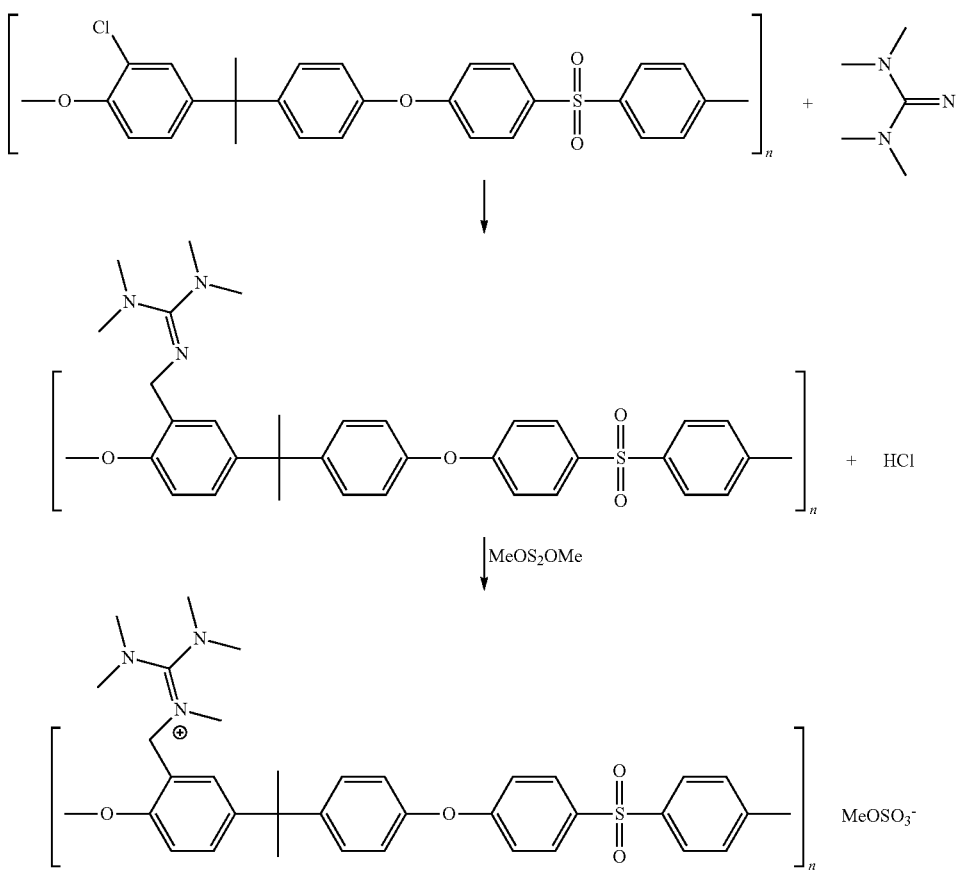

A similar reaction can proceed with polyether ether ketone (PEEK), in which PEEK is initially chloromethylated, and then derivatized with TMG as described above, then reacted with a dialkyl sulfate to produce the following polymeric exchange material:

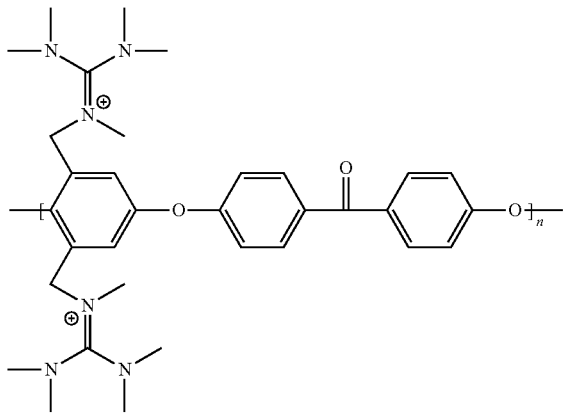

where n is an integer of from about 1 to about 100,000.

The same procedure described above for Bisphenol A to derivatized polysulfone and PEEK, coupled with the procedure for producing polymer-tethered PMG (chlorinating polymer, reacting with TMG, and then reacting with dialkyl sulfate) can be used to make the following polymeric exchange materials derivatized with PMG.

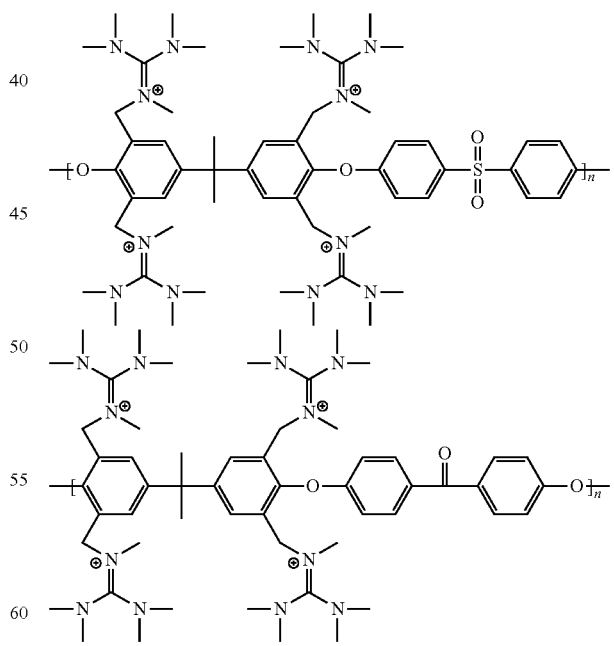

where n is an integer of from about 1 to about 100,000 in both polymeric exchange materials.

In a similar fashion any number of anions can be grafted onto the polymer backbones described herein and used as a cationic exchange ionomer. For example, a variety of polymers can be modified to contain a replaceable positively charged species at sites on the polymer chain that are separate from the sites containing ketone and sulfone groups (or other groups containing a double-bonded oxygen or other double bond such as in polyphenylene or polystyrene). The ability to more densely charge provides more sites to replace the positively charged species with an anion, such as phosphates, halophosphates, especially hexafluorophosphate, alkylphosphates, arylphosphates, nitrate, sulfate, bisulfate, alkylsulfates, arylsulfates, perfluorinated alkyl- and arylsulfates, sulfonate, alkylsulfonates, arylsulfonates, perfluorinated alkyl- and arylsulfonates, especially trifluoromethylsulfonate, tosylate, perchlorate, tetrachloroaluminate, heptachlorodialuminate, tetrafluoroborate, alkylborates, arylborates, amides, especially perfluorinated amides, dicyanamide, saccharinate, thiocyanate, carboxylates, acetates, preferably trifluoroacetate, and bis(perfluoroalkylsulfonyl)amide anions, chloride ($Cl^-$), hydroxide ($OH^-$), hexafluorophosphate ($PF_6^-$), iodide, other halides, tetrafluoroborate, bis(trifluoromethylsulfonyl) imide ($C_2F_6NO_4S_2^-$), trifluoromethanesulfonate ($CF_3O_3S^-$ $CF_3SO_3^-$; $TfO^-$), dicyanamide ($N(CN)_2^-$; dca), benzoate, acesulfame, saccharinate, methanesulfonate. isethionate ([ise]), taurinate ([tau]), 3-morpholinopropanesulfonate (MOPS), 4-(2-hydroxyethyl)-1-piperazinepropanesulfonate (HEPPS, EPPS), 1,4-piperazinediethanesulfonate (PIPES), N-(2-acetamido)-2-aminoethanesulfonate (ACES), N-cyclohexyl-3-aminopropanesulfonate (CAPS), 4-(2-hydroxyethyl)-1-piperazineethanesulfonate (HEPES), 2-[(2-hydroxy-1,1-bis(hydroxymethyl)ethyl)amino]ethanesulfonate (TES), N-[tris(hydroxymethyl)methyl]-3-aminopropanesulfonate (TAPS), 3-(N-tris[hydroxymethyl]methylamino)-2-hydroxypropanesulfonate (TAPSO), and mixtures thereof. This substitution of the anion and positively charged species derivatizes the polymeric building blocks with a material that permits cations to move across the membrane, while excluding anions from moving the other way.

The polymeric exchange materials described herein may be used as the sole electrolyte in a battery, preferably a metal-air battery, or it may be used in conjunction with a liquid electrolyte. Any liquid electrolyte may be used in conjunction with the exchange membrane, but ionic liquids are preferred.

In a zinc-air battery using ionic liquid electrolytes, the water content is typically controlled to minimize hydrogen evolution, control plating morphology, and maintain a constant water activity within the cell. The water content can be controlled even further when using the polymer exchange materials described herein, especially when used alone without an additional electrolyte. On discharge, Zn metal is oxidized at the fuel electrode and solvated or complexed into solution, releasing electrons into the circuit. Simultaneously, molecular oxygen is reduced at the air electrode consuming those electrons released at the anode. Upon reaching the solubility of zinc ions, ZnO is precipitated within the cell. On charge, $Zn^{2+}$ ions are reduced at the negative (fuel) electrode. Simultaneously at the air electrode, an oxidation reaction that results in the evolution of molecular oxygen occurs. FIG. 1 illustrates how the polymeric exchange membrane functions to prevent $Zn^{2+}$ ions from migrating to the cathode (air) electrode.

During charging of aqueous alkaline metal-air batteries, hydroxide is oxidized at the air electrode forming water and releasing $O_2$ gas while oxidized zinc species are reduced to zinc metal at the metal electrode. The Faradaic or coulombic efficiency is the efficiency with which electrons (charge) are transferred in an electrochemical system. Efficiency losses are generally caused by electrons which participate in unproductive reactions and short circuits. At the metal electrode during charge, hydrogen evolution from the reduction of water is an example of such an unproductive reaction. This parasitic reaction degrades the coulombic efficiency. However, because zinc has a large overpotential for the hydrogen evolution reaction in aqueous electrolytes, coulombic efficiencies on the order of 95% are seen.

Certain ionic liquids useful in the preferred embodiments allow anywhere from 0.1-50% (or even higher) water into a zinc-air ionic liquid battery which supports the oxygen reduction reaction (ORR) at the air electrode during discharge. Additionally, small quantities of water within ionic liquids destabilize the well-known superoxide species ($O_2^{\cdot-}$) that is generated in aprotic media, high pKa conjugate acids, and basic media via disproportionation reactions. The use of the polymer ion exchange membranes by themselves, without the use of an electrolyte such as an ionic liquid stabilizes and/or prevents the generation of superoxide species, as well as restricts hydrogen evolution from water on zinc discussed above.

In a metal-air battery, the metal is the fuel. That is, during discharge the metal is oxidized at the anode, providing electrons which can be used for electrical work. The oxidation reaction may be represented by the following equation:

$$\text{Metal} \rightarrow \text{Metal}^{n+}(n)e^- \qquad (3)$$

The metal fuel may be of any type, and may be electrodeposited, absorbed, physically deposited, or otherwise provided on or constituting the fuel electrode. The fuel may be of any metal, including alloys or hydrides thereof, for example. For example, the fuel may comprise transition metals, alkali metals, alkali earth metals, and other or "poor" metals. Transition metals include, but are not limited to zinc, iron, manganese, and vanadium. The most common alkali metal is lithium but other alkali metals may be used. The other metals include, but are not limited to magnesium, aluminum and gallium. As used herein, the term metal fuel refers broadly to any fuel comprising a metal, including elemental metal, metal bonded in a molecule or complex, including oxides, metal alloys, metal hydrides, etc. The fuel electrode may be formed of the metal fuel as the electrode body itself in some embodiments.

The fuel electrode may have any construction or configuration. For example, the fuel electrode may be a porous structure with a three-dimensional network of pores, a mesh screen, a plurality of mesh screens isolated from one another, or any other suitable electrode. The fuel electrode includes a current collector, which may be a separate element, or the body on which the fuel is received may be electroconductive and thus also be the current collector. In an embodiment, the fuel electrode is laminated, bonded, or attached to a backing that provides the external surface of the fuel electrode. This backing may be liquid impermeable or essentially impermeable to the ionic liquid to prevent the ionic liquid from permeating outwardly through the fuel electrode via its external surface. More preferably, the backing is also impermeable to air, and particularly oxygen or other oxidant, to prevent any undesirable parasitic reaction, such as oxidant reduction in the presence of the fuel oxidation that occurs at the electrode during discharge.

Further details regarding metal fuels and fuel electrodes may be found in U.S. patent application Ser. Nos. 12/385,217, 12/385,489, 12/885,268, 12/901,410, 12/631,484, 12/549,617, 13/019,923, 13/028,496, 61/193,540, 61/301,377, 61/323,384, 61/329,278, 61/365,645, 61/394,954, 61/358,339, 61/383,510 and 61/243,970, the disclosures of each of which is incorporated by reference herein in their entirety.

During discharge, oxygen at the air electrode is reduced, consuming electrons. There are several possible mechanisms for oxygen reduction. The oxygen reduction reaction may occur, for example, via one of the three mechanisms discussed below. Other mechanisms, however, may occur depending on the chemical system (ionic liquid, electrode materials) chosen.

A first possible and non-limiting mechanism is a four-electron oxygen reduction reaction (ORR) where the product is a fully reduced oxygen dianion. The four-electron oxygen reduction reaction may be represented by the following equation:

$$O_2 + 2H_2O + 4e^- \rightarrow 4OH^- \quad (4)$$

Depending on the specific chemistry of the system, this reaction may form a soluble product or result locally in the formation of an insoluble metal-oxide.

In this reaction, the anions liberated may serve to mediate continued anode reaction. Relative to the other oxygen reduction mechanisms, the four-electron oxygen reduction reaction has the advantages of increased energy density and extracting the maximum number of electrons per oxygen molecule.

A second possible and non-limiting mechanism is a two-electron peroxide route. An example of this mechanism may be represented by the following equation:

$$Zn^{2+} + O_2 + 2e^- \rightarrow ZnO_2 \quad (6)$$

This mechanism has the advantage of relatively low overpotentials for the peroxide reaction. It also tends to have enhanced rechargeability relative to the first mechanism. The two-electron peroxide mechanism, however, results in lower energy density at the oxygen electrode battery relative to a four-electron process.

A third possible and non-limiting mechanism is a mixed two-electron/four-electron ORR that capitalizes on the reducing power of certain aliovalent cations. An example of this mechanism may be represented by the following equation:

$$Mn^{2+} + O_2 + 2e^- \rightarrow MnO_2 \quad (7)$$

The nuance in this mechanism is that the product involves fully reduced $O^{2-}$ species generated by the reducing power of the aliovalent metal. In this example, $Mn^{2+}$ ends up in the $Mn^{4+}$ state on the right. This mechanism has the advantage of lower overpotentials due to reducing power of the aliovalent cation. Further, aliovalent metals may be used to make more efficient cells. The mixed two-electron/four-electron mechanism, however, results in a lower energy density battery relative to a four-electron process.

Air electrodes are typically porous structures made of polytetrafluoroethylene (PTFE) materials such as Teflon®. Preferably, the air electrode material has a high degree of solvophobicity with the electrolyte. Solvophobicity within the air electrode serves the dual roles of "wet-proofing" (i.e. preventing liquid electrolyte from leaving the cell) and improving access of the oxygen in the air to the oxygen reduction reaction catalyst within the porous structure. Access to the catalyst is enhanced by solvophobicity due to an increase in the triple junction line length of air-catalyst-electrolyte. The increase in the triple junction line length reduces transport limitations. While a strong solvophobic character is advantageous, however, including solvophilic constituents in the electrode improves the tortuosity of the triple junction, improving superficial reaction site density.

FIG. 2 illustrates an electrochemical cell ("electrochemical cell"), generally indicated at 10, according to the embodiments of the present invention. As illustrated and described below, the electrochemical cell 10 includes a plurality of electrodes including a first electrode 12 and a second electrode 14. In other embodiments, the first electrode or the second electrode of the electrochemical cell 10 may be provided by configurations other than a single electrode. For example, the electrochemical cell may have any desired configuration, including, but not limited to, coin or button cells, prismatic cells, cylindrical cells (e.g., AA, AAA, C, or D cells in addition to other cylindrical configurations), flow cells, fuels cells, etc. Further, the electrochemical cell may be a primary (disposable, single-use) or a secondary (rechargeable) battery. Rechargeable cells are available due to the development of bifunctional air electrodes and the utilization of rechargeable anode materials.

In the non-limiting embodiment illustrated in FIG. 2, the first electrode 12 is a cathode, and more specifically an air cathode, and will be referred to hereinafter as an air electrode 12. The second electrode 14 is an anode, and will be referred to hereinafter as a metal electrode 14. In an embodiment, and as described below, the electrochemical cell 10 may generate electricity by virtue of an oxidation half-reaction of a fuel at the metal electrode 14 in parallel, that is, substantially at the same time, with a reduction half-reaction of an oxidizer 20 at the air electrode 12. The illustrated embodiment is not intended to be limiting in any way.

The air electrode 12 and the metal electrode 14 preferably are spaced apart to form a gap 16 therebetween. A polymeric exchange material (or anion exchange membrane), either alone or in combination with a room temperature ionic liquid (RTIL), generally indicated at 18, may exist along the gap 16 so that the electrolyte or polymeric exchange material 18 may contact both the air electrode 12 and the metal electrode 14 at the same time. For purposes of this discussion, reference numeral 18 may be referred to simply as electrolyte 18, with the understanding that electrolyte 18 may be comprised solely of the polymeric exchange material, or a liquid electrolyte (ionic liquid or aqueous electrolytes as discussed herein) in combination with the polymeric exchange material. In an embodiment, it should be understood that the electrochemical cell 10 may be oriented in any way, and if a flowing liquid electrolyte were used, the electrolyte may flow in directions other than what is illustrated by the arrows in FIG. 2. Thus, any directional references are made with regard to the orientation as shown in FIG. 2, and are not intended to limit a working embodiment to any particular orientation. In other embodiments, the electrolyte 18 may be static with no flow at all, such as when the electrolyte 18 consists solely of the polymeric exchange material. The electrolyte 18 may make contact with the air electrode 12 at an air electrode/electrolyte interface 24. The electrolyte 18 may make contact with the metal electrode 14 at a metal electrode/electrolyte interface 26. In a preferred embodiment, only the polymeric exchange material is used as a solid electrolyte, and consequently, the electrolyte does not flow. That is, no mechanism for forced flow is included in the cell.

If the electrolyte 18 includes an RTIL, it is preferred in certain embodiments that the RTIL contain water to facilitate the electrochemical reactions (discharging and charging over a number of cycles) taking place within the electrochemical cell 10. Preferably, the ionic liquid includes water in amounts of from about 15% to about 50%, more preferably from about 20% to about 40%, and most preferably from about 25% to about 30%. In electrochemical cells 10 that do not comprise a cathode and/or anode that requires water to facilitate the electrochemical reactions, it is preferred that the RTIL comprise less than about 25% water, more preferably less than about 20%, even more preferably less than about 15% water.

Those skilled in the art will be capable of determining the appropriate amount of water to include in the RTIL prepared in accordance with the embodiments, using the guidelines provided herein.

As alluded to above, a reduction half-reaction may take place at the air electrode 12. In an embodiment, an oxidizer 20 may be reduced through the reduction half-reaction at the air electrode 12. For non-limiting illustration purposes, the electrons from the metal electrode 14 may flow to an external circuit 22 (i.e., a load) and return to the air electrode 12 to facilitate the reduction of the oxidizer 20. The oxidizer 20 preferably is reduced on the air electrode 12 at oxidizer reduction reaction sites 21. In an embodiment, a catalyst is used to facilitate the oxidizer reduction half-reaction at the oxidizer reduction reaction sites 21. The air electrode 12 may include catalyst material, such as manganese oxide, nickel, pyrolized cobalt, activated carbon, silver, platinum, or any other catalyst material or mixture of materials with high oxygen reduction activity for catalyzing reduction of the oxidizer, which will be discussed below. In an embodiment, the air electrode 12 may be porous and the porous body with a high surface area may comprise the catalyst material.

In an embodiment, the air electrode 12 may be a passive or "breathing" air electrode 12 that is passively exposed, such as through windows or openings to an oxidizer source (typically oxygen present in ambient air) and absorbs the oxidizer 20 for consumption in the electrochemical cell 10 reactions. That is, the oxidizer 20 will permeate from the oxidizer source into the air electrode 12. Thus, the oxidizer 20 need not be actively pumped or otherwise directed to the air electrode 12, such as via an inlet. Any part of the air electrode 12 by which the oxidizer 20 is absorbed or otherwise permeates or contacts the air electrode 12 may be generically referred to as an "input." The term input may broadly encompass all ways of delivering oxidizer to the air electrode 12 for the oxidizer reduction half-reaction at the oxidizer reduction reaction sites 21 on the air electrode 12.

By means of a non-limiting illustration, the air electrode 12 may be a gas permeable electrode having an outer surface exposed to ambient air such that the oxidizer 20 comprises oxygen that permeates the air electrode 12. Similarly, the air electrode 12 may comprise a barrier membrane on the outer surface of the air electrode 12 that is gas permeable and liquid impermeable so as to permit permeation of the oxidizer 20 via the outer surface of the air electrode 12 and prevent the RTIL, if used, from flowing through the outer surface of the air electrode 12. In an embodiment, the air electrode 12 may be a porous body covered on the inner side by a liquid permeable layer through which the RTIL, if used, may pass through so that the RTIL may contact the porous body.

The relationship between the electrolyte 18 and the air electrode 12 may impact the overall energy density of the electrochemical cell 10. For that reason, the vapor pressure and surface tension characteristics of the electrolyte 18 in view of the air electrode 12 should be carefully selected. For instance, in an embodiment, the air electrode 12 may repel the RTIL, if used, so that it may prevent the electrolyte 18 from wicking, that is, flowing in a capillary-like manner through the air electrode 12. In another embodiment, the air electrode 12 may be designed with porosity to absorb the RTIL so that it exposes the RTIL to more air electrode 12 surface area for purposes of enabling the desired electrochemical reactions at the air electrode 12. The air electrode 12 may support catalyst decoration at the oxidizer reduction reaction sites 21 to improve the efficiency of the reaction. In an embodiment, the catalyst may be decorated with metal ions which may enhance the activity of the catalyst in catalyzing the oxidizer reduction reaction at the oxidizer reduction reaction sites 21 on the air electrode 12. The air electrode 12 may have a high ionic conductivity to provide reactants and remove products of the oxidizer reduction reaction from the air electrode 12. In an embodiment, the air electrode 12 may have high electrical conductivity character to carry electrons from the external load 22 to the oxidizer reduction reaction sites 21. The air electrode 12 and electrolyte 18 characteristics may be further defined.

In an embodiment, metal-oxide by-products 28 may be formed at the metal electrode 14. Whereas reduced oxidizer ions in an aqueous electrolyte coordinate, that is, donate electrons to water molecules to form water, peroxides and/or hydroxides, and thereby increase problems with vapor pressure and corrosion, in this non-limiting embodiment, the electrolyte 18 may promote both the oxidizer reduction reaction at the air electrode 12 and the conduction of the reduced oxidizer ions to the metal electrode 14. In support of this result, the electrolyte 18 may contain soluble species that interact with the reduced oxidizer ions, especially when used together with an RTIL that typically is protic. The electrolyte 18 also may support the reduced oxidizer ions as they migrate to the metal electrode 14. By means of a non-limiting illustration, the migration of the reduced oxidizer ions may refer to transport of the reduced oxidizer ions via convection transport, or conduction transport or diffusion transport. The electrolyte 18 may also support the oxidized metal-fuel ions remaining at the metal electrode 14. In doing so, the electrolyte 18 promotes the reaction between the reduced oxidizer ions and the oxidized metal-fuel ions to produce the metal-oxide by-products 28. In an embodiment, the metal-oxide by-products 28 may be stored at the metal electrode 14. In an embodiment where the metal-oxide by-product 28 is stored at the metal electrode 14, this embodiment is best used as a primary (i.e., non-rechargeable) battery, as the oxygen is stored at the metal electrode 14 and is not locally available to an oxygen evolving electrode for oxidation of the reduced oxygen species.

The storage of the metal oxide locally at the air electrode is facilitated by the air electrode 12 having a pore size in at least the regions contacting the ionic liquid sufficient to contain the oxide within the air electrode 12 body. That is, the pore size may be dependent on the size of the oxide. A network of such pores may increase the storage capacity of the air electrode 12.

In an embodiment, the oxidizer source is ambient air, and the oxidizer 20 is oxygen. In an embodiment, oxygen as the oxidizer 20 may be reduced at the air electrode 12 to form reduced oxygen ions. In an embodiment, the oxygen may be supplied from an evolved oxygen recovery system used in a regenerative electrochemical cell. Other examples of electrochemical cells that may be useful embodiments of the invention herein are shown, for example, in U.S. patent application Ser. No. 12/549,617, filed on Aug. 28, 2009, which is incorporated herein by reference in its entirety.

The electrolytes of the present invention may be used in other cell configurations. An alternate cell configuration, for example, comprises a compact wound cell illustrated in U.S. Patent Application No. 61/267,240 and Ser. No. 12/776,962, hereby incorporated by reference in their entirety.

Because of evaporation, water electrolysis during recharging, and self-discharge, aqueous electrolytes can be problematic for metal air batteries. These problems not only result in a loss of electrolyte but also a reduction in the round trip efficiency of a rechargeable battery. The use of polymeric exchange material as the electrolyte, alone or in combination with an ionic liquid, reduces or may eliminate some of these problems. Even with an ionic liquid electrolyte, however, the presence of water may cause the release of toxic gases and/or cause self-discharge. On the other hand, an ionic liquid may include small amounts of water. For example, water contents of 10-100 ppm have been found to improve oxygen reduction in aprotic systems without causing unacceptable self-discharge or release of toxic gases. Consequently, some preferred embodiments include ionic liquids containing anywhere from about 5 to about 100,000 ppm water, more preferably from about 7 to about 1,000 ppm water, and most preferably from about 10 to about 100 ppm water.

In some embodiments, the ion exchange material, including the solid ionomer, may contain one or more salts, such as a salt added as an additive to the solid ionomer, and optionally additional additives. The salt may include an inorganic or organic salt, which may be added as a dopant additive. Non-limiting examples of salts are included below, and others may also be used.

| Cation | Anion | Maximum concentration by wt % |
|---|---|---|
| C1dabconium | hydroxide | 80 |
|  | fluoride | 80 |
|  | chloride | 5 |
|  | bromide | 80 |
|  | tetrafluoroborate | 80 |
|  | hexafluorophosphate | 80 |
|  | carbonate | 80 |
|  | isethionate | 20 |
|  | sulfate | 20 |
|  | sulfamate | 20 |
|  | taurinate | 20 |
| Tetramethylammonium | hydroxide | 60 |
|  | flouride | 60 |
|  | carbonate | 60 |
| Alkyammonium | OH | 70 |
|  | flouride | 70 |
|  | carbonate | 70 |
| Pentamethylguanadinium | OH | 70 |
|  | fluoride | 70 |
|  | carbonate | 70 |
| Tetramethylguanadinium | OH | 70 |
|  | fluoride | 70 |
|  | carbonate | 70 |
| Potassium | hydroxide | 49 |
|  | fluoride | 49 |
|  | carbonate | 49 |

The use of a salt in the solid ionomer is believed to be beneficial for various reasons, including providing any one or more of the following functions: increasing ionic conductivity, preventing passivation by increasing Zn solubility by way of Zn ion complexation, and, especially in the case of F—, acting as a humectant to increase the amount of water available for electrochemistry. The amounts used may be lower, and in fact much lower, than the maximums stated in the chart and a range between trace amounts and the stated maximum may be used. Suitable additives include any known additives useful in the electrochemical arts, such as, organic molecules having a neutral electrostatic charge. Non-limiting examples include phthalates, adipates, sebacates, maleates, benzoates, sulfonamides, organophosphates and polybutene.

In other embodiments, the ion exchange material may contain free cations that are not bound to the polymer backbone, which are believed to function in a manner similar to the salts described above. Additional additives also may be added. The free cation may be the same cation bound to the polymer, or different, or may contain combinations of the cation bound to the polymer and one or more of the cations listed in the above table.

The ion exchange material containing free cations may be prepared by first preparing a solid ion exchange material comprised of a polymer derivatized with a cation using any of the techniques described above. The solid ion exchange material then can be dissolved in a suitable solvent, optionally facilitated by grinding the solid and dissolving in the solvent. Suitable solvents include, for example, alcohols, di-substituted amides, sulfoxides, and sulfones.

An ionic liquid containing any of the cations described herein, including the cation bound to the polymer backbone, and mixtures thereof, that may be added to the solvent mixture such that free or "un-bound" cation exists in the mixture. Any method of adding the cation may be used, including addition of an ionic liquid, or addition of an ionic solid containing the cation. Additives also may be added to the mixture. The mixture then can be used to form a solid film or coating using techniques known in the art to provide a solid ionic exchange material that contains the polymer, free cations, and optionally additives. This solid film or coating then can be used as a solid electrolyte, or as a coating or one or more layers on an electrode.

All publications, patents, and patent applications cited herein are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The forgoing embodiments have been provided solely to illustrate example of the present invention and should not be considered limiting. To the contrary, the present invention encompasses all modifications, substitutions, alterations, and equivalents within the spirit and scope of the embodiments described herein.

What is claimed is:

1. An ionic exchange material comprising a polymer derivatized with one or more cations;
   wherein the polymer is represented by the following formula:

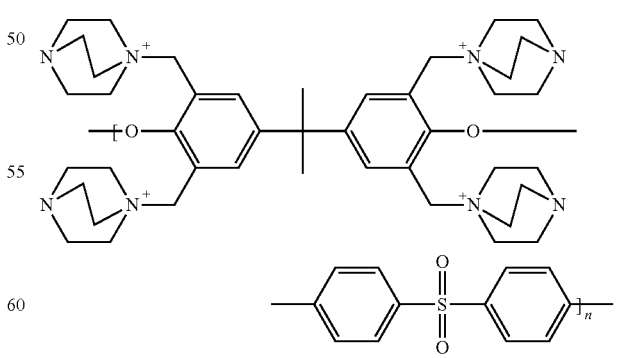

where n is an integer from 1 to about 100,000.

2. A metal-air electrochemical cell comprising:
   a fuel electrode for oxidizing a fuel during a discharging operation;

an air electrode configured to absorb and reduce gaseous oxygen during the discharging operation; and an electrolyte comprising the ionic exchange material of claim 1.

3. The metal-air electrochemical cell of claim 2, wherein the air electrode contains fluoropolymers.

4. The metal-air electrochemical cell of claim 2, wherein the air electrode is porous.

5. The metal-air electrochemical cell of claim 2, wherein the fuel electrode comprises a metal fuel.

6. The metal-air electrochemical cell of claim 2, wherein the fuel electrode is porous.

7. The metal-air electrochemical cell of claim 2, wherein the cell is a secondary cell in which, during a charging operation, the fuel electrode is configured to reduce metal ions to electrodeposit the metal fuel thereon, a charging electrode is configured to evolve oxygen, and the ionic exchange material permits conduction of ions between the electrodes to support the reactions, the charging electrode being selected from the group consisting of the air electrode and an electrode separate from the air electrode.

8. An ionically conductive medium for use in an electrochemical cell comprising a fuel electrode and an air electrode for absorbing and reducing gaseous oxygen, comprising:

the ionic exchange material of claim 1.

9. The ionically conductive medium as claimed in claim 8, wherein the ionic exchange material further comprises a salt.

10. The ionically conductive medium as claimed in claim 9, wherein the salt is the salt of a cation bound to the ionic exchange material.

11. The ionically conductive medium as claimed in claim 9, wherein the salt is formed from a cation selected from the group consisting of potassium, tetramethylammonium, alkynolaminium, 1,4-diazabicyclo[2.2.2]octane (DABCO), 3-dimethylamino-2,2-dimethyl-1-propanol (alkynolamine), 1,1,2,3,3-pentamethylguanidine (PMG), and mixtures thereof, and an anion selected from the group consisting of hydroxide, fluoride, carbonate, chloride, bromide, tetrafluoroborate, hexafluorophosphate, isethionate, sulfate, sulfamate, taurinate, and mixtures thereof.

12. The ionically conductive medium as claimed in claim 11, wherein the salt is a potassium salt.

13. The ionically conductive medium as claimed in claim 11, wherein the salt is a salt of a quarternary ammonium cation.

14. The ionically conductive medium as claimed in claim 11, wherein the salt is a salt of an alkyl ammonium cation.

15. The ionically conductive medium as claimed in claim 8, wherein the ionic exchange material further comprises an additive selected from one or more organic molecules having a neutral electrostatic charge.

16. An electrochemical power generation device comprising:

an anode;

a cathode; and a solid electrolyte comprising the ionic exchange material of claim 1.

* * * * *